United States Patent
Gallery

[19]

[11] Patent Number: 5,900,849
[45] Date of Patent: May 4, 1999

[54] DISPLAY HEADSET

[75] Inventor: Richard D. Gallery, Horley, United Kingdom

[73] Assignee: U.S. Philips Corporation, New York, N.Y.

[21] Appl. No.: 08/637,253

[22] Filed: Apr. 24, 1996

[30] Foreign Application Priority Data

May 25, 1995 [GB] United Kingdom ............ 9510614

[51] Int. Cl.⁶ ..................................................... G09G 5/00
[52] U.S. Cl. ............................. 345/8; 345/7; 348/53; 273/148 B
[58] Field of Search ......................... 345/8, 2; 349/111; 348/53, 56, 115, 116; 359/458, 462, 630; 463/30, 51; 273/148 B; 364/578

[56] References Cited

U.S. PATENT DOCUMENTS

| | | | |
|---|---|---|---|
| 4,695,129 | 9/1987 | Faessen et al. | 350/96.25 |
| 5,621,424 | 4/1997 | Shimada et al. | 345/8 |
| 5,641,288 | 6/1997 | Zaenglein, Jr. | 434/21 |
| 5,662,525 | 9/1997 | Yasumura et al. | 463/30 |

FOREIGN PATENT DOCUMENTS

| | | | |
|---|---|---|---|
| 0545684A2 | 6/1993 | European Pat. Off. | G06G 15/72 |
| 2201069 | 8/1988 | United Kingdom | H04N 13/04 |
| 2266428 | 10/1993 | United Kingdom | H04N 13/04 |

OTHER PUBLICATIONS

Spear, "Virtual Reality", UK Patent Office Information Monographs Series, PIM 10, 1993, pp. 23–25.

*Primary Examiner*—Jeffery A. Hofsass
*Assistant Examiner*—Julie B. Lieu
*Attorney, Agent, or Firm*—Dwight H. Renfrew, Jr.

[57] ABSTRACT

A collision warning system is for a head mounted display (HMD) (10) worn by a user, for example as the interface to a virtual reality system, to warn of nearby objects in the physical environment. A motion detector (30,32) detects positional changes of the HMD, which changes are reflected in changes of a displayed image viewpoint, and a comparator stage (38,40) determines whether the movement takes the user into a "prohibited" area. If so, a visual and/or audible warning is provided to the user via the HMD (10). In an embodiment, the display screens (18) of the HMD include liquid crystal display shutters (20) which are switched to a transparent state in the event of an imminent collision such that the user is not only warned of the danger but also able to see it without having to remove or adjust the HMD.

15 Claims, 3 Drawing Sheets

DISPLAY HEADSET

BACKGROUND OF THE INVENTION

1. Field of the Invention

The present invention relates to graphical user interfaces for computer systems and, in particular, to head mounted displays (HMDs) for use in virtual reality (VR) and related applications.

2. Description of the Related Art

HMDs are used within VR to present pictures of a virtual world to a user, to track that users head position, and also to block out sight of the real world so that the user sees only the virtual world. Examples of patents and patent applications relating to such headsets are given in "Virtual Reality" by B. J. Spear, UK Patent Office Patent Information Monographs series PIM10, 1993, at pages 23–25. Amongst those described is U.S. Pat. No. 4,695,129 to U.S. Philips Corporation which provides a headset which enables film and television pictures to be watched in large format. Changes in user viewing direction cause that part of a larger picture displayed to the user to be changed accordingly. Another of those described is GB-A-2,201,069 of J. D. Waldern (assigned to W Industries) which shows a headset specifically designed for virtual reality applications, particularly in relation to computer games/arcade machines. Two high resolution VDU's provide stereoscopic vision to the user and it is envisaged that the system will have more than one headset such that multiple users can occupy the virtual space and interact with each other and/or with computer-generated models.

The form taken by the virtual world will depend on the intended use of the system and may, for example, comprise the interior of a building for an architectural modelling application, urban or surreal landscapes for games applications, or an environment where the user is presented with molecular models which can be manipulated. In the following, the term "virtual environment" will be used for such virtual landscapes or situations: the term "physical environment" will be used to denote the 'real-world' surroundings of the user, for example sitting or standing in a room and wearing the HMD.

Once wearing the HMD, the user can become immersed in the virtual environment, causing them to forget about, or become disoriented with respect to, the physical environment. This can lead to problems with the physical environment placing restrictions on the users movement or actions, without these restrictions being apparent to the user within the virtual environment. As an example, where the system maps the users real movements (such as walking) into the virtual environment, the virtual environment may be showing to the user a clear street along which he can walk when in the real world he is in an enclosed space. This leads to the phenomenon of "glass walls" within the virtual environment which cannot be seen but are nonetheless painful to walk into. Whilst this problem might be avoided in specialist situations where a virtual environment is modelled with reference to a specific physical environment, such an approach is not possible for more general applications.

Within Location Based Entertainment (LBE) VR, the conventional approach has been to restrict the user to a small, safe area by means of tying them down or placing them in a small enclosure. This however is not a particularly practical solution for a consumer (home) environment. There is also still the problem of unexpected reactions due to interaction with the virtual environment. As an example, when immersed in a VR game playing scenario, a user may find himself confronted by a monster and their reaction is to flee via the nearest apparent exit: in the real world this could translate to the user jumping up from his chair and tripping over a connecting cable to the HMD or possibly even running into a wall.

It is therefore an object of the present invention to provide means for reducing the danger to users immersed in a virtual environment from their surrounding physical environment.

SUMMARY OF THE INVENTION

In accordance with the present invention there is provided a display apparatus comprising an image data processor and a head mounted display (HMD) to be worn by a user, the apparatus including: a motion detector arranged to detect positional changes of the HMD with respect to its physical environment; and an image generator coupled thereto and operable to generate images of a virtual environment from a user viewpoint, with the said viewpoint changing in response to positional changes of the HMD, and to display the said images on a display screen of the HMD; characterised in that limits on HMD movement in one or more directions within the physical environment are specified to the motion detector, and the image data processor is further operable to indicate an alarm condition to a user of the HMD when one or more of the said limits is exceeded. In this way, the user immersed in the virtual environment is warned if he is potentially endangering himself in the physical environment.

The present invention also provides a method of operating a display apparatus comprised of an image processing system generating images of a virtual environment and displaying them to a user through a head mounted display (HMD), comprising the steps of: specifying limits of permissible HMD movement in one or more directions within the physical environment; detecting positional changes of the HMD with respect to its physical environment; and, when one or more of the said limits is exceeded, providing an indication of an alarm condition to the user of the HMD.

The alarm condition may suitably be indicated to the user by terminating the displayed images of the virtual environment and providing the user with a view of the physical environment: in this way the user is both alerted to the danger and returned to the environment where that danger is present.

In an embodiment to be described, the display screen of the HMD may include at least a window portion with an associated drive circuit configured to render the window opaque when displaying the images of the virtual environment and substantially transparent when indicating an alarm condition. In such an embodiment, the drive circuit suitably includes a timer and is configured to render the window substantially transparent if a predetermined resetting signal is not received within a predetermined period, to provide the HMD with a fail-safe state which does not leave the user in darkness.

In an alternative embodiment, a source of images of the physical environment (such as one or more video cameras mounted on the HMD) may be provided with selector means coupled thereto and to the image generator and operable, in response to an alarm condition, to supply to the HMD display, images of the physical environment from the said source in place of the images of the virtual environment.

The motion detector may include one or more fixed sensors in the proximity of the user, or may include proximity sensing means mounted on the HMD and operable to detect objects within the physical environment in one or more directions and at a given range, with the said limits on HMD movement being taken as exceeded when an object is detected.

Suitably, user input means may be provided, coupled to the motion detector, by use of which a user may enter physical values defining the said limits of HMD movement. Alternatively, some form of set-up routine may be provided for in which the user positions the HMD at positions of maximum permissible displacement, which positions are logged by the motion detector prior to the user entering the virtual environment.

BRIEF DESCRIPTION OF THE DRAWINGS

Further features and advantages of the present invention will become apparent from reading of the following description of preferred embodiments of the invention, by way of example only, and with reference to the accompanying drawings, in which.

DESCRIPTION OF THE PREFERRED EMBODIMENTS

Figure 1:
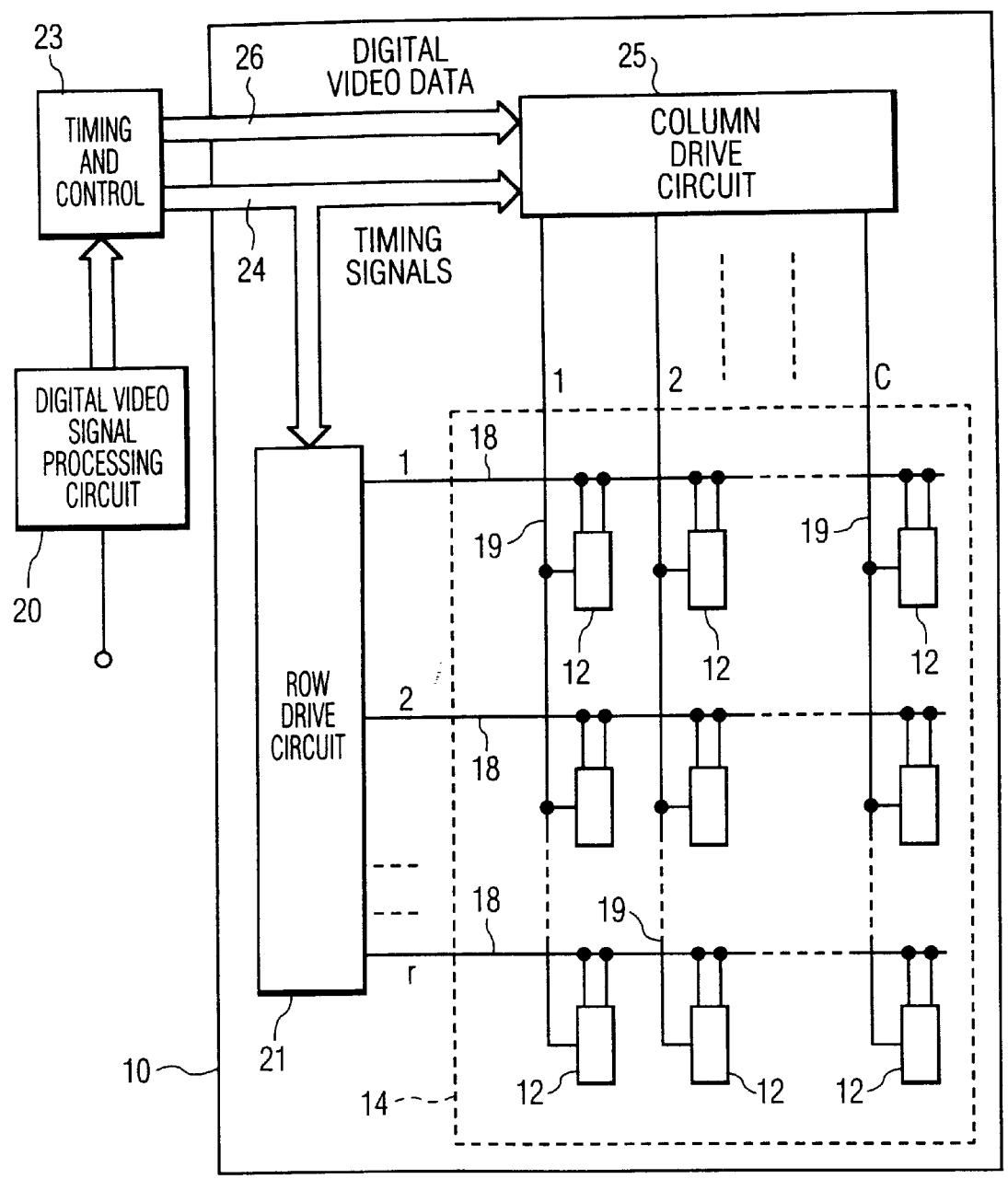
FIG. 1 represents a first configuration of an HMD and associated image source embodying the invention.

A first arrangement of the system is illustrated in FIG. 1 and comprises an HMD unit 10 with an associated image generation and processing stage 12 linked by a tracking telemetry link 14H–14P. The HMD 10 comprises a support frame 16 worn on the head of the user with a pair of liquid crystal display screens 18 positioned like spectacle lenses in front of the eyes with window portions 20 (to be described) above each lens. To enhance the degree of immersion, the support frame may be extended (as at 20) to block peripheral vision of the physical environment, and audio accompaniment to the virtual environment scenario may be provided via headphone speakers 22, also attached to the frame.

The processing stage 12 has an interface 24 for the telemetry link 14H–14P with the HMD, which distributes signals from the HMD to the various processing stage functions as shown in the Figure. A corresponding interface (not shown) in the HMD distributes the audio and video signals. An image generator 26 generates images of the virtual environment with reference to stored information 28 defining that environment and to signals from a motion detector stage 30, and supplies these images to the HMD where they are displayed on the screens. The images are preferably produced as a stereo pair, giving the impression of binocular vision and hence three-dimensional imaging to the user. The motion detector signals indicate changes in the position of the HMD, as determined by motion sensors 32 mounted on the support frame, with these signals being used to determine shifts in the apparent user viewpoint in terms of the virtual environment.

An audio accompaniment to the virtual environment is provided by audio stage 34 with reference to stored information 36 and to the current situation within the scenario as determined from the image generator 26.

In order to detect whether a user is risking a collision with the physical environment, a collision detector stage 38 compares the received motion information from the motion detect stage 30 with preset limits stored in a memory 40: user input means such as a keypad 42 are suitably provided to enable a user to set these limits before entering the virtual environment.

The form of the limits will depend on the expected physical situation of the user; for example, where the user is expected to remain seated at all times, the limits may specify that movement in any single direction is permitted for no more than 0.5 m from a preset point of origin, or that continuous movement in a single direction is permitted for no longer than 1.0 seconds. The form of the limits will also be determined by the detected motion available. Where the HMD motion sensors 32 are simple accelerometers, a continuous-motion time limit is suitable due to the uncertainty in the absolute position of the HMD. Where more detailed positional information is available, for example through one or more external sensors 44 positioned about the physical environment, limits in terms of range of movement or explicit limit positions may be specified. To provide for simple implementation of this last option, the system suitably provides for a set-up mode in which the user carries the HMD to boundary positions beyond which movement is hazardous. These positions are monitored by the motion detect stage 30 and stored as limits in the memory 40 (as shown by dashed line 46).

When the collision detector stage 38 determines that one or more of the limits has been exceeded, it indicates the occurrence of this alarm condition to the image generator 26 which then provides a visual warning to the user via display screens 18, for example in the form of a warning image called up from memory 28 and flashed on the screen. Instead of, or in addition to, the visual warning, an audio alarm may be triggered by the collision detector, from memory 36 via audio stage 34 to the headphone speakers 22.

In a preferred version, the LCD display screen drivers are constructed such that at least the window portions 20 of the screens may be rendered substantially transparent in response to a simple switch signal SWITCH TRANSPARENT sent by the image generator 26 following receipt of an alarm condition signal. In this way, images from the physical environment can be seen through the HMD such that the user is not only alerted to the alarm condition, but also rapidly enabled to determine its cause without having to remove the HMD. The position of the window portions 20 should be such that it does not affect the image display but still provides the viewer with at least restricted vision of the environment. An alternative or additional window position allowing peripheral vision is indicated by dotted lines at 21.

Figure 2:
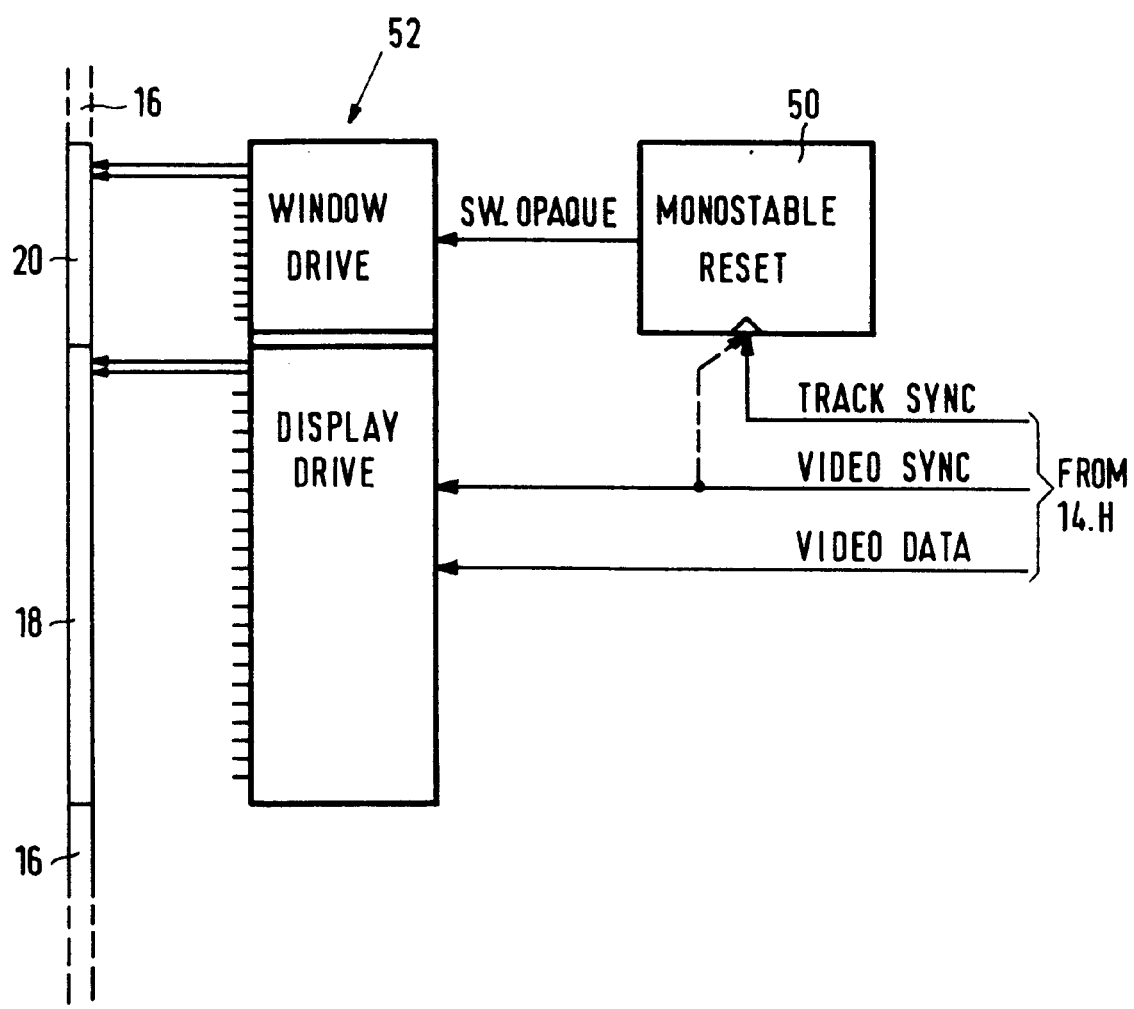
FIG. 2 schematically illustrates a display switching process in the operation of the HMD of FIG. 1.

The transparent/opaque shutter action of the window portions is set to transparent in a "fail-safe" mode: this is achieved by configuring the drivers to require supply of a signal SWITCH OPAQUE (instead of SWITCH TRANSPARENT) to darken the window portions when displaying the input video images and which, unless it is received, will cause the driver to set the window portions to transparent. As shown in FIG. 2, a monostable device 50 is provided storing the SWITCH OPAQUE signal to the window driver circuit 52 of the window portions 20 which signal is reset to false (i.e. such that the driver circuit switches to transparent) unless triggered at a regular interval. The trigger is provided by the video SYNC FIELD signal or, where a time division multiplexed tracking telemetry link 14H–14P is used then, as shown, tracker sampling synchronisation signals are used to trigger monostable 50. This has the advantage of allowing the SWITCH OPAQUE signal to be transmitted via the same path as the tracking signals whilst ensuring that the window portions will revert to transparent should the tracking fail or be turned off for any reason.

By use of layering of electro-optical materials, the image display portion of the screen and the window portion may be made overlapping to allow direct vision in alarm conditions, with the shuttered window portion providing a back plane to the LCD display. This however may compromise the displayed image quality.

Further alternative modifications of the HMD and processor stage of FIG. 1 will now be described with reference to FIG. 3. Those features whose function is as for FIG. 1 are denoted by the same reference numerals and will not be again described.

Figure 3:
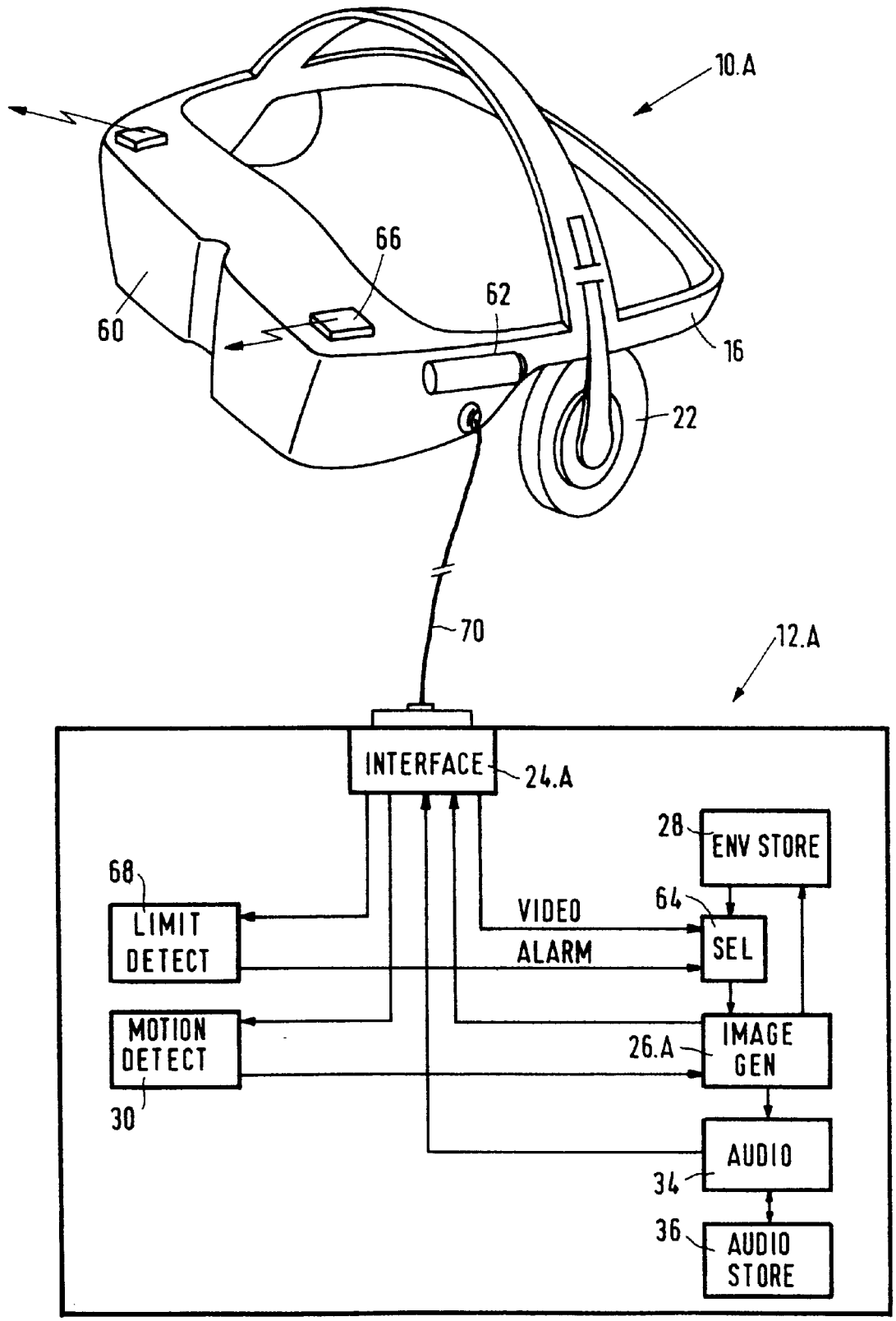
FIG. 3 represents a further configuration of an HMD and modified image source embodying the invention.

Instead of LCD screens, the HMD of FIG. 3 is provided with a pair of miniaturised cathode ray tube (CRT) screens 60. As such screens cannot be rendered transparent, one or more video cameras 62 are provided mounted on the HMD which supply video images of the user surroundings to a selector stage 64 within the processor 12A. In the event that an alarm condition signal is generated, this signal is passed to the selector stage 64 which substitutes the images of the virtual environment sent to the HMD with images from the cameras 62 of the physical environment. The image generator 26A shown in FIG. 3 is substantially identical to that of FIG. 1 save in that it is not required to handle alarm condition signals.

The HMD of FIG. 3 also features a simplified collision avoidance detection stage: instead of determining its actual position, the HMD is provided with directional proximity sensors 66 which generate a signal if the HMD comes within a predetermined range of another object. The output of the proximity sensors is monitored by a limit detect stage 68 and, if any of them generates a signal, an alarm condition is signalled to the selector stage 64. A slight drawback with the use of proximity sensors is that their detection range is not generally easy to alter, but this at least partly balanced by the simplification they provide to the system. A wired link 70 replaces the telemetry link of FIG. 1: its connection to the HMD should be positioned such as to be unobtrusive to the user, and also such as to be unlikely to activate one of the proximity sensors in normal use. Its interface 24A to the image data processor 12A provides appropriate multiplexing and demultiplexing functions where the link 70 is a single wire link: where a multi-wire cable provides the link, interface 24A may simply be a multi-way connector.

It will be recognised that the variations between the embodiments of FIGS. 1 and 3 are not exclusive to those embodiments, and a system may be composed of features from both. For example, an LCD screen HMD may be coupled to the image data processor by wired link and use proximity sensors to detect likely conditions. In such a case, the above-described reset trigger to prevent failsafe to transparent is suitably provided by the synchronisation signal accompanying the display image data. Additionally, whilst both FIGS. 1 and 3 have shown the display devices mounted in front of the user's eyes, it will be readily understood by those skilled in the art that they may be mounted at the side of the user's head and project images onto a plain screen in front of the user's eyes. With such an arrangement it will be seen that, rather than providing video cameras to the CRT display embodiment of FIG. 3, parts of the display screen may be formed as electro-optical shutters as described with reference to FIG. 1.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

I claim:

1. A display apparatus comprising an image data processor and a head mounted display (HMD) to be worn by a user, the apparatus including:

a motion detector arranged to detect positional changes of the HMD with respect to its physical environment; and an image generator coupled thereto and operable to generate images of a virtual environment from a user viewpoint, with the user viewpoint changing in response to positional changes of the HMD, and to display the images on a display screen of the HMD;

characterised in that limits on extents of HMD movement in at least one direction within the physical environment are specified to the motion detector, and the image data processor is further operable to indicate an alarm condition to the user of the HMD when at least one of the limits is exceeded.

2. Apparatus as claimed in claim 1, wherein the alarm condition is indicated to the user by terminating the display of images of the virtual environment and providing the user with a view of the physical environment.

3. Apparatus as claimed in claim 2, wherein the display screen of the HMD includes at least a window portion having an associated drive circuit configured to render the window portion opaque when displaying the images of the virtual environment and substantially transparent when indicating an alarm condition.

4. Apparatus as claimed in claim 3, wherein the drive circuit includes timer means and is configured to render the window portion substantially transparent if a predetermined resetting signal is not received within a predetermined period.

5. Apparatus as claimed in claim 2, wherein the window portion comprises electro-optical material which is rendered substantially transparent or opaque in response to an applied electrical current, and the drive circuit is arranged to supply that current.

6. Apparatus as claimed in claim 2, further comprising a source of images of the physical environment and selector means coupled thereto and to the image generator and operable, in response to an alarm condition, to supply to the HMD display, images of the physical environment from the source of images in place of the images of the virtual environment.

7. Apparatus as claimed in claim 6, in which the source of images of the physical environment comprises at least one video camera mounted on the HMD.

8. Apparatus as claimed in claim 1, wherein the motion detector includes proximity sensing means mounted on the HMD and operable to detect at least one object within the physical environment at a given range, with the limits on HMD movement being taken as exceeded when the at least one object is detected.

9. Apparatus as claimed in claim 1, further comprising user input means coupled to the motion detector, by use of which the user may enter physical values defining the limits of HMD movement.

10. Apparatus as claimed in claim 1, wherein the movement of the HMD is determined by a continuous-motion time limit.

11. A method of operating a display apparatus comprised of an image processing system generating images of a virtual environment and displaying them to a user through a head mounted display (HMD), comprising the steps of:

specifying limits of permissible extents of HMD movement in at least one direction within the physical environment;

detecting positional changes of the HMD with respect to its physical environment; and when at least one of the limits is exceeded, providing an indication of an alarm condition to the user of the HMD.

12. The method of claim 11, wherein the step of specifying the limits of permissible extents of HMD movement includes the step of placing the HMD at at least one of the permissible extents of HMD movement.

13. A display apparatus comprising:

an image data processor, a head mounted display (HMD) to be worn by a user, that displays images of a virtual environment, a means for determining a location of the HMD, and a means for indicating an alarm condition when the location of the HMD is beyond a predefined boundary area.

14. The display apparatus of claim 13, wherein the means for indicating an alarm condition includes a means for affecting the images of the virtual environment that are displayed on the HMD.

15. The display apparatus of claim 13, wherein the means for determining the location of the HMD includes proximity detectors.

* * * * *